United States Patent
Jones et al.

(10) Patent No.: US 9,016,152 B2
(45) Date of Patent: Apr. 28, 2015

(54) ACTUATOR ARRANGEMENT

(75) Inventors: Tony Jones, Birmingham (GB); John Herbert Harvey, Wolverhampton (GB); Michael Paul Somerfield, Stoke-on-Trent (GB)

(73) Assignee: Goodrich Actuation Systems Limited (GB)

( * ) Notice: Subject to any disclaimer, the term of this patent is extended or adjusted under 35 U.S.C. 154(b) by 1702 days.

(21) Appl. No.: 12/246,771

(22) Filed: Oct. 7, 2008

(65) Prior Publication Data
US 2009/0090204 A1    Apr. 9, 2009

(30) Foreign Application Priority Data

Oct. 9, 2007    (GB) .................................. 0719689.2
Oct. 16, 2007   (GB) .................................. 0720193.2

(51) Int. Cl.
*F16H 25/20* (2006.01)
*F16H 25/22* (2006.01)
*F16H 25/24* (2006.01)
*B64C 13/28* (2006.01)

(52) U.S. Cl.
CPC ............ *F16H 25/2454* (2013.01); *B64C 13/28* (2013.01); *F16H 2025/2087* (2013.01)

(58) Field of Classification Search
CPC .................................................. F16H 25/2454
USPC .................................. 74/89.35, 89.39, 89.23
See application file for complete search history.

(56) References Cited

U.S. PATENT DOCUMENTS

| | | | |
|---|---|---|---|
| 3,436,973 A * | 4/1969 | Aweimrine | 74/89.39 |
| 3,563,106 A | 2/1971 | Goodman | |
| 4,867,295 A * | 9/1989 | Metcalf et al. | 192/141 |
| 5,467,661 A | 11/1995 | Lange | |
| 7,861,611 B2 * | 1/2011 | Martin et al. | 74/89.37 |
| 2005/0184599 A1 | 8/2005 | Culpi | |
| 2007/0144279 A1* | 6/2007 | Wu et al. | 74/22 A |
| 2009/0090203 A1* | 4/2009 | Jones et al. | 74/89.39 |
| 2010/0077879 A1* | 4/2010 | Davies et al. | 74/89.38 |

OTHER PUBLICATIONS

European Search Report dated Jun. 2, 2009.

* cited by examiner

*Primary Examiner* — William Kelleher
*Assistant Examiner* — Terence Boes
(74) *Attorney, Agent, or Firm* — Cantor Colburn LLP

(57) ABSTRACT

An actuator arrangement comprises a rotatable shaft, a nut mounted upon the shaft and translatable along the shaft upon rotation of the shaft relative to the nut, and a lock arrangement operable to lock the shaft and nut against relative rotation, the lock arrangement comprising a lock component mounted upon one of the shaft and the nut for axial movement relative thereto but held against angular movement relative thereto, the lock component being co-operable with an abutment provided on the other of the shaft and the nut, or a component associated therewith, to lock the shaft and nut to one another against relative rotation.

13 Claims, 2 Drawing Sheets

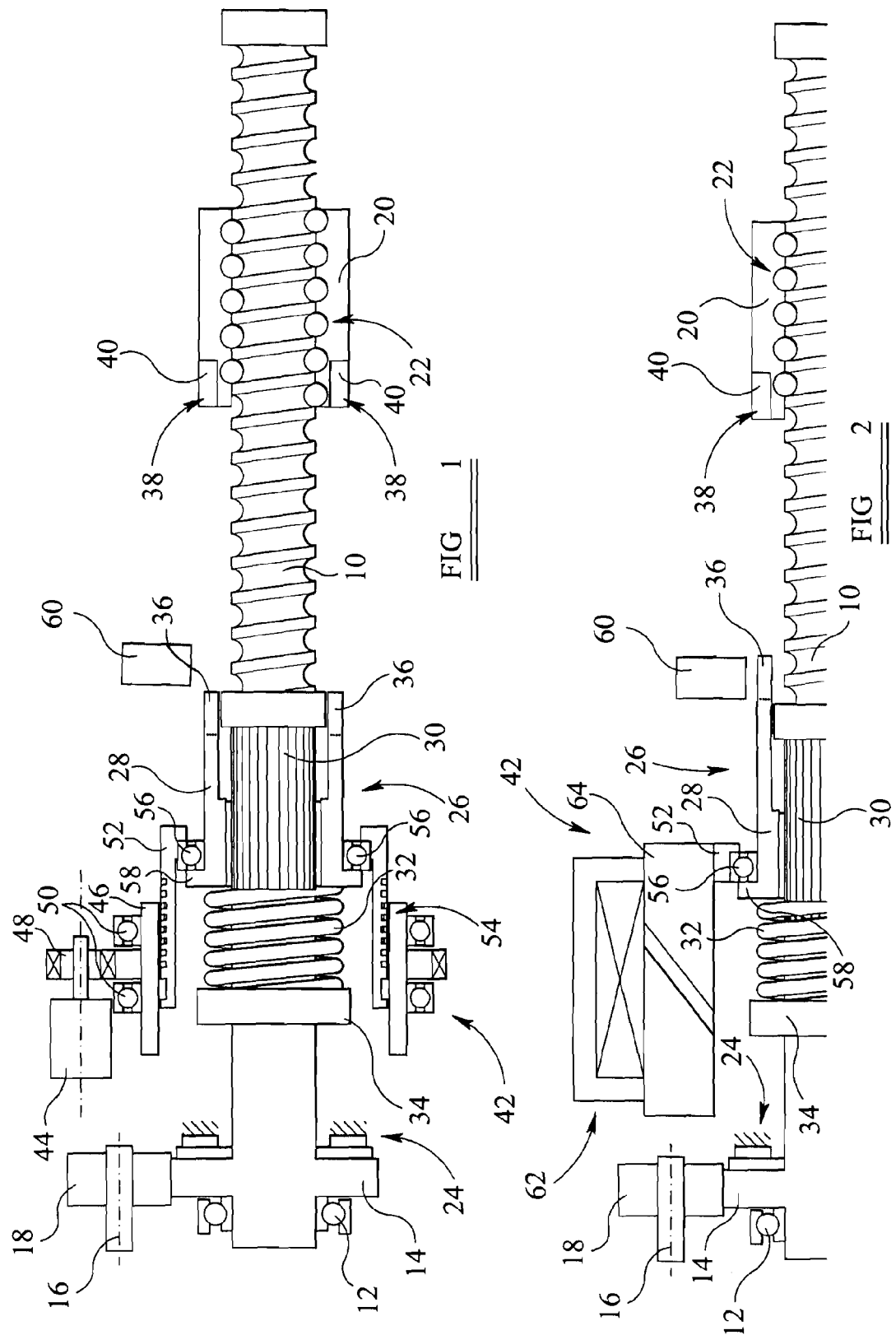

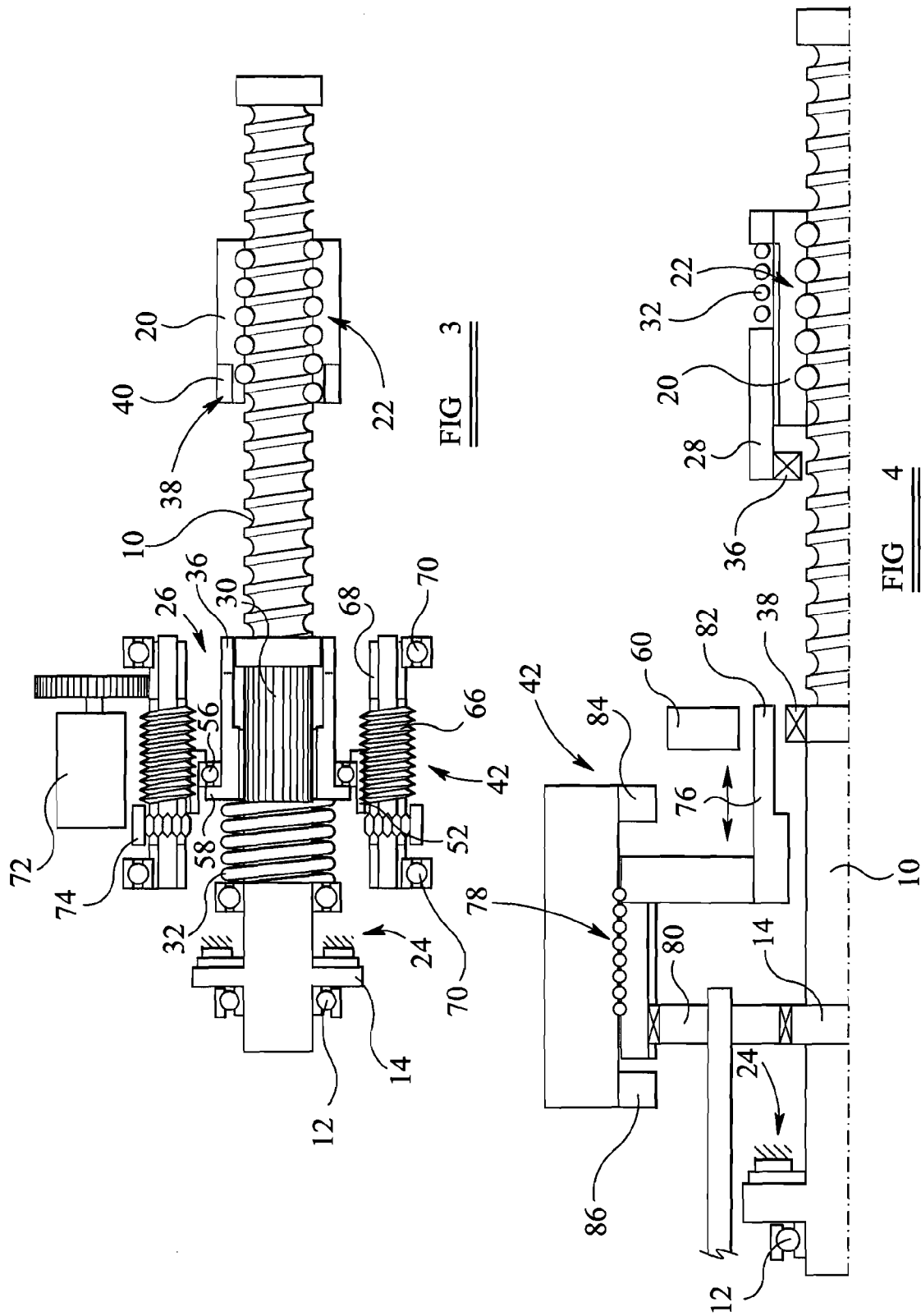

ACTUATOR ARRANGEMENT

This invention relates to an actuator arrangement, and in particular to an actuator arrangement suitable for use in driving the thrust reverser cowls or other moveable components of an aircraft between stowed and deployed positions. Although suitable for use in such applications, the actuator arrangement of the invention may be used in other applications.

There is a requirement to provide the actuator arrangements used in moving the thrust reverser cowls of an aircraft with a lock arrangement so as to prevent movement of the cowls other than when desired. The lock arrangements provided in the actuator arrangements are additional to lock arrangements typically provided on the cowls themselves and to lock arrangements provided in the drive mechanisms used to power the actuator arrangements. It is an object of the invention to provide an actuator arrangement including such a lock arrangement which is of relatively simple and convenient form.

According to the present invention there is provided an actuator arrangement comprising a rotatable shaft, a nut mounted upon the shaft and translatable along the shaft upon rotation of the shaft relative to the nut, and a lock arrangement operable to lock the shaft and nut against relative rotation, the lock arrangement comprising a lock component mounted upon one of the shaft and the nut for axial movement relative thereto but held against angular movement relative thereto, the lock component being co-operable with an abutment provided on the other of the shaft and the nut, or a component associated therewith, to lock the shaft and nut to one another against relative rotation.

Preferably, a drive mechanism is provided, the drive mechanism being operable to retract the lock component away from the abutment. The lock component is preferably spring biased towards a locking position.

The lock component may comprise a sleeve splined to the shaft. The drive mechanism may comprise a motor and gear arrangement operable to retract the sleeve. Alternatively, the drive arrangement may comprise a solenoid actuator operable to retract the sleeve. In a further embodiment, a ballscrew arrangement may be used to drive the sleeve for movement.

In another arrangement, the lock component may be slidably mounted upon the nut. For example it may comprise a sleeve splined to the nut and cooperable with an abutment provided on or associated with the shaft. The drive mechanism preferably includes a push member, moveable to push the sleeve out of engagement with the abutment. For example, a motor driven gear arrangement may be used to move the push member. The motor used to drive the gear arrangement may also be used to drive the shaft for rotation.

The invention will further be described, by way of example, with reference to the accompanying drawings, in which:

FIG. 1 is a diagrammatic view illustrating an actuator arrangement in accordance with an embodiment of the invention; and FIGS. 2 to 4 are views similar to FIG. 1 illustrating further embodiments of the invention.

Referring firstly to FIG. 1 there is illustrated an actuator arrangement intended for use in driving a thrust reverser cowl between stowed and deployed positions. The actuator arrangement comprises a shaft 10 supported for rotation within a housing (not shown) by bearings 12, the bearings 12 limiting axial movement of the shaft 10. The shaft 10 incorporates an input gear 14 to which drive is supplied from a motor (not shown) via an input shaft 16 and associated gear 18.

Upon the shaft 10 is mounted a nut 20, a ball screw type coupling 22 being provided between the nut 20 and the shaft 10. The nut 20 is secured, in use, to the thrust reverser cowl with which the actuator arrangement is being used, the nature of the connection of the nut 20 to the cowl being such that the nut 20 is held against rotation. It will be appreciated that, in use, rotation of the shaft 10 causes the nut 20 to translate axially along the shaft 10 resulting in corresponding movement of the cowl. The direction of translation of the nut 20 is dependent upon the direction in which the shaft 10 is rotated.

In use, after movement of the cowl away from its stowed position has commenced, aiding loads are experienced by the cowl urging it towards its deployed position, and the motor operates during this phase of the operation to control the speed of deployment by controlling the rotary speed of the shaft 10. A no-back device 24 is provided to further assist in controlling the movement of the cowl during this phase of the cowl deployment cycle. No-back devices are well known and the specific design of the no-back device is not of relevance to the invention, so no further description of the structure or function of the no-back device is included herein.

In accordance with the invention, a lock arrangement 26 is provided, the lock arrangement 26 being operable to lock the nut 20 and shaft 10 to one another against relative angular or rotary movement. The lock arrangement 26 comprises a lock sleeve 28 which is mounted upon the shaft 10 so as to rotate with the shaft 10 and moveable in the axial direction of the shaft 10. This is achieved by mounting the sleeve 28 on the shaft 10 by spline formations 30. A spring 32 is engaged between an end of the sleeve 28 and an outwardly extending flange or collar 34 provided on the shaft 10, the spring 32 urging the sleeve 28 to the right in the orientation illustrated. The sleeve 28 is formed with a pair of projections 36 which are receivable within corresponding recesses 38 formed in the nut 20 when the nut 20 occupies its left hand most, retracted position and when the sleeve 28 occupies its right hand most, locked position. With the projections 36 located in the recesses 38, the projections 36 can engage abutment surfaces 40 defined by the recesses 38, thereby locking the nut 20 and shaft 10 to one another against relative rotation, the sleeve 28 being non-rotatably mounted upon the shaft 10 by the spline formations 30 and non-rotatably engaged with the nut 20 by the engagement of the projections 36 with the abutment surfaces 40 of the recesses 38.

The lock arrangement 26 includes a drive mechanism 42 operable to retract the sleeve 28 and thereby release the shaft 10 for rotation relative to the nut 20. The drive mechanism 42 comprises a motor 44, conveniently in the form of an electric motor, operable to drive a drive tube 46 for rotation via a gear arrangement 48. The drive tube 46 is supported for rotation by bearings 50 mounted on the housing. The bearings 50 retain the drive tube 46 against axial movement.

A tubular coupling member 52 extends into the drive tube 46, the interior of the drive tube 46 and the exterior of the member 52 being provided with interengaging Acme thread formations 54. The member 52 is non-rotatably mounted within the housing, but is axially movable relative thereto. It will be appreciated that, in use, operation of the motor 44 to drive the drive tube 46 for rotation results in axial movement of the member 52.

The member 52 is provided, at its right hand end, with an inwardly extending flange which supports a bearing 56. The bearing 56 is cooperable with an outwardly extending flange 58 formed at the left hand end of the sleeve 28, holding the sleeve 28 captive to the member 52 whilst permitting the sleeve 28 to rotate relative to the member 52. Although the bearing 56 and flange 58 are cooperable with one another, it should be noted that the flange 58 is not secured to the bearing 56 and so is able to separate therefrom.

A sensor 60 is mounted upon the housing and is operable to monitor or sense the position of the sleeve 28. The sensor 60 may take a range of forms. For example, it could be a microswitch, optical, capacitance or Hall effect based sensor. However, it is currently preferred to use an inductive position sensor.

In use, starting from a condition in which the nut 20 occupies its left hand most, retracted position, the projections 36 of the sleeve 28 are received within the recesses 38 of the nut 20, and the shaft 10 and nut 20 are locked to one another against relative rotation as described hereinbefore. When it is desired to deploy the thrust reverser cowl, the lock arrangement 26 is released by driving the motor 44 to rotate the drive tube 46, such rotation causing the member 52 to move to the left. The cooperation between the drive tube flange, bearing 56 and flange 58 results in such movement being transmitted to the sleeve 28, retracting the projections 36 from the recesses 38, thus releasing the lock between the shaft 10 and the nut 20. The movement of the sleeve 28 away from its locked position is sensed by the sensor 60 which outputs a signal indicative of the lock arrangement being released.

Once the lock arrangement 26 has been released, the shaft 10 can be rotated to cause the nut 20 to translate, moving the cowl towards its deployed position. After movement of the nut 20 has commenced, the motor 44 may be driven to return the drive tube 52 to its original position, the spring 32 ensuring that the sleeve 28 then moves to its locked position.

Return movement of the cowl towards its stowed position is achieved by rotating the shaft 10 in the reverse direction to retract the nut 20. When the nut 20 is just less than half a revolution of the shaft 10 from its fully retracted position, the ends of the projections 36 will engage the nut 20 and continued movement of the nut 20 due to rotation of the shaft 10 will push the sleeve 28 to the left in the orientation illustrated, against the action of the spring 32. Continued rotation of the shaft 10 to move the nut 20 to its fully retracted position will bring the projections 36 into alignment with the recesses 38, whereon the sleeve 28 will move under the action of the spring 32, returning the sleeve 28 to its locked position with the projections 36 located within the recesses 38 and bearing against the abutment surfaces 40 to lock the shaft 10 against rotation relative to the nut 20. FIG. 2 shows the case where the sleeve 28 is in the unlocked, retracted position.

The sensor 60 will output a signal, at this point, indicating that the sleeve 28 is in its locked position which, in combination with a signal indicative of the nut 20 being in its fully retracted position, indicates that the actuator arrangement is locked against extension.

Although the arrangement described hereinbefore makes use of two projections 36 and associated recesses 38, it will be appreciated that fewer or more projections 36 and corresponding recesses 38 may be provided, and the timing at which engagement between the sleeve 28 and the nut 20 commences towards the end of the retraction cycle will be modified accordingly.

FIG. 2 illustrates an arrangement which is similar to that described hereinbefore with reference to FIG. 1, with the exception that the drive mechanism 42, instead of using a motor, drive tube and acme screw coupling to drive the member 52 for axial movement to release the lock arrangement, uses a solenoid actuator 62, the armature 64 of which is connected to the member 52. Operation of this arrangement is much as described hereinbefore except that to release the lock arrangement 26 the actuator 62 is energised to move the armature 64 and sleeve 28 against the action of the spring 32, the armature 64 and sleeve 28 returning to their locked position upon deenergisation of the actuator 62 under the action of the spring 32.

FIG. 3 illustrates a further alternative form of drive mechanism 42 for the member 52. In this arrangement the member 52, like that of FIG. 1, is non-rotatably mounted but is able to move axially. The exterior of the member 52 is provided with formations which cooperate through a series of roller screw type couplings 66 with screw shafts 68 mounted for rotation by bearings 70. One of the screw shafts 68 is driven for rotation by a motor 72, a drive ring gear 74 meshing with teeth formed on all of the shafts 68 to transmit the motor drive to the shafts 68. In use, to release the lock arrangement 26 the motor 72 is driven thereby rotating all of the screw shafts 68. The rotation of the screw shafts 68 drives the member 52 for axial movement, the movement of the member 52 being transmitted to the sleeve 28 to retract the projections 36 from the recesses 38. As with the arrangement of FIG. 1, after the nut 20 has commenced movement, the motor 72 can be driven in the reverse direction to rearm the lock arrangement 26.

The arrangement illustrated in FIG. 4 differs from the arrangements described hereinbefore in that the sleeve 28, rather than being splined to the shaft 20, is mounted upon the nut 20. The nature of the mounting of the sleeve 28 on the nut 20 is such that the sleeve 28 is axially moveable but is retained against rotation relative to the nut 20. For example, this may be achieved using a splined coupling. A spring 32 is engaged between the nut 20 and the sleeve 28 urging the sleeve 28 to the left in the orientation illustrated. The sleeve 28 is provided with radially inwardly extending projections 36.

The shaft 10 is provided with a locking ring in which is formed recesses 38 within which the projections 36 of the sleeve 28 can be received when the nut 20 occupies its left hand most, retracted position, the recesses 38 defining abutment surfaces 40. It will be appreciated that in this position the shaft 10 is locked to the nut 20 against relative rotation.

The drive mechanism 42 used to release the lock arrangement 26 comprises a push member 76 coupled via a ball screw coupling 78 to a fixed housing such that rotation of the push member 76 results in axial movement thereof. The push member 76 is provided, internally, with teeth arranged to mesh with the teeth of a series of planet drive gears 80 which also mesh with the input gear 14 of the shaft 10, the drive gears 80 being arranged to be driven, in use, by a motor or actuator (not shown).

In use, starting with the actuator arrangement in its retracted, locked position, when it is desired to deploy the thrust reverser cowl the drive gears 80 are rotated. Initially, the rotation of the drive gears 80 results only in rotation, and hence axial movement, of the push member 76 as the shaft 10 is locked against rotation at this point by the operation of the lock arrangement 26. The axial movement of the push member 76 results in an end part 82 thereof engaging the sleeve 28, pushing the sleeve 28 to the right in the orientation illustrated against the action of the spring 32. The movement of the sleeve 28 retracts the projections 36 from the recesses 38, thereby releasing the lock arrangement 26. The push member 76 will continue to move to the right until its movement is halted by engagement thereof with a stop 84, drive still being applied preferentially to the push member 76 rather than to the shaft 10 due to the braking load applied to the shaft 10 by the no-back device 24. Once the push member 76 engages the stop 84, further movement of the push member 76 is not permitted and so drive is applied to the shaft 10 resulting in translation of the nut 20 and deployment of the cowl as described hereinbefore.

To retract the cowl, the drive gears 80 are rotated in the reverse direction. Initially this results in the push member 76 being retracted. Once the push member 76 is fully retracted and in engagement with a stop 86, drive is applied by the drive gears 80 to the shaft 10 to drive the nut 20 towards its retracted position.

In a manner similar to that of the arrangements described hereinbefore, as the nut 20 approaches its fully retracted position the sleeve 28 will engage the locking ring and will be urged against the action of the spring 32 until the rotation of the shaft 10 brings the recesses 38 and projections 36 into alignment with one another, at which point the spring 32 will drive the sleeve 28 to its locked position in which the projections 36 are received within the recesses 38, at which point the shaft 10 will be locked against rotation relative to the nut 20.

It will be appreciated that, like the embodiment of FIG. 1, the embodiments of FIGS. 2 to 4 may include more or fewer projections 36 and corresponding recesses 38, and that the timing of the engagement as the nut 20 approaches its retracted position will be adjusted accordingly.

A number of other modifications and alterations may be made to the arrangements described hereinbefore without departing from the scope of the invention.

The invention claimed is:

1. An actuator arrangement comprising a rotatable shaft, a nut mounted upon the shaft and translatable along the shaft upon rotation of the shaft relative to the nut, and a lock arrangement operable to lock the shaft and nut against relative rotation, the lock arrangement comprising a lock component mounted upon one of the shaft and the nut for axial movement relative thereto but held against angular movement relative thereto, the lock component being co-operable with an abutment provided on the other of the shaft and the nut, or a component associated therewith, to lock the shaft and nut to one another against relative rotation.

2. An arrangement according to claim 1, wherein a drive mechanism is provided, the drive mechanism being operable to retract the lock component away from the abutment.

3. An arrangement according to claim 1, wherein the lock component is spring biased towards a locking position.

4. An arrangement according to claim 1, wherein the lock component comprises a sleeve.

5. An arrangement according to claim 4, wherein the sleeve is splined to the shaft.

6. An arrangement according to claim 4, wherein the drive mechanism comprises a motor and gear arrangement operable to retract the sleeve.

7. An arrangement according to claim 2, wherein the drive mechanism comprises a solenoid actuator operable to retract the sleeve.

8. An arrangement according to claim 4, wherein a ballscrew arrangement is used to drive the sleeve for movement.

9. An arrangement according to claim 1, wherein the lock component is slidably mounted upon the nut.

10. An arrangement according to claim 9, wherein the lock component comprises a sleeve splined to the nut and co-operable with the abutment which is provided on or associated with the shaft.

11. An arrangement according to claim 2, wherein the drive mechanism includes a push member, moveable to push the lock component out of engagement with the abutment.

12. An arrangement according to claim 11, wherein a motor driven gear arrangement is used to move the push member.

13. An arrangement according to claim 12, wherein the motor driven gear arrangement also drives the shaft for rotation.

* * * * *